United States Patent [19]

Murai

[11] Patent Number: 4,586,162
[45] Date of Patent: Apr. 29, 1986

[54] BIT PATTERN CHECK CIRCUIT

[75] Inventor: Masao Murai, Tokyo, Japan

[73] Assignee: NEC Corporation, Tokyo, Japan

[21] Appl. No.: 566,458

[22] Filed: Dec. 28, 1983

[30] Foreign Application Priority Data

Dec. 28, 1982 [JP] Japan .................................. 57-231049

[51] Int. Cl.$^4$ ............................................ A11C 13/00
[52] U.S. Cl. ........................................ 365/51; 365/189
[58] Field of Search .................... 365/51, 63, 72, 189, 365/230

[56] References Cited

PUBLICATIONS

The Bipolar Digital Integrated Circuits Data Book, pp. 7–43, 7–45, 7–46 and 7–52, Texas Instruments.

*Primary Examiner*—Terrell W. Fears
*Attorney, Agent, or Firm*—Sughrue, Mion, Zinn, Macpeak and Seas

[57] ABSTRACT

In a bit pattern check circuit, there are provided three memory devices and a bit pattern input is divided into portions of the number same as that of the memory devices. One portion of the divided bit pattern input is stored in the first memory device. The second and third memory devices are inputted with the other portions of the divided bit pattern and outputs of preceding memory devices respectively. The content of the third or last stage memory device is outputted through an OR gate circuit.

6 Claims, 6 Drawing Figures

BIT PATTERN CHECK CIRCUIT

BACKGROUND OF THE INVENTION

This invention relates to a bit pattern check circuit.

Generally, a bit pattern check circuit is used when transmitting bit information signals each comprising a plurality of bits for the purpose of checking whether each bit information is correctly sent with a predetermined bit pattern or not. In a known bit pattern check method, a plurality of check circuits of a number equal to that of the type of the predetermined patterns are prepared. With this method, however, the number of hardware elements increases with the number of patterns, thereby complicating the circuit construction. According to another method, a single memory device is used and bit information signals are applied to the address input terminals of the memory device. Thus a check is made as to whether a given bit pattern is correct or not by outputting pattern information signals stored in the memory addresses designated by the bit information signals. This method is advantageous in that the bit patterns can be checked with a single circuit even when the type of the pattern is large. With this method, however, as the bit information signals are supplied to the address input terminals of the memory device it is necessary to increase the address terminals of the memory device with the bit number, which increases the capacity of the memory device and makes it difficult to construct the same. For example, a typical data information utilized for data transmission is made up of 20 to 30 bits so that a memory device capable of receiving such bit information signal as an address information can not be available at present unless the memory device is manufactured by a special design requiring many difficulties.

SUMMARY OF THE INVENTION

Accordingly it is a principal object of this invention to provide a novel bit pattern check circuit having a simple construction and capable of accurately checking a plurality of bit patterns each comprising many bits.

Another object of this invention is to provide an improved bit pattern checking circuit which can be fabricated at a low cost by utilizing ordinary elements and can check a plurality of bit patterns each comprising many bits.

According to this invention, these and further objects can be accomplished by providing a bit pattern check circuit comprising a plurality of memory devices of a first and following stages, the memory device of the first stage being inputted into its addresses one of divided bit pattern input portions obtained by dividing a bit pattern input into a plurality of portions of a number equal to that of the memory devices; the other memory devices being inputted into their addresses a combination of remaining portions of the divided bit pattern input and outputs of memory devices of preceding stages thereby storing data respectively representing bit patterns of respective memory devices corresponding to a bit pattern to be checked, and means for detecting coincidence of the inputted bit patterns in accordance with the content of the last stage memory device.

DESCRIPTION OF THE PREFERRED EMBODIMENT

Figure 1:
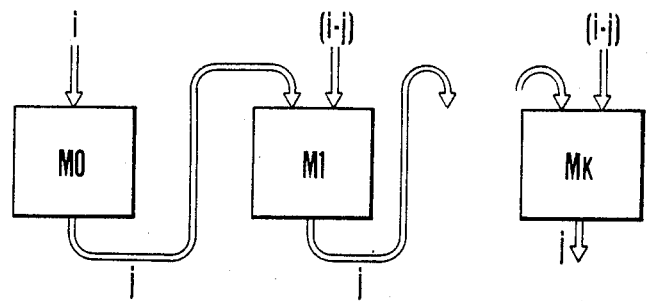
FIG. 1 is a diagrammatic representation showing the basic construction of one embodiment of the bit pattern check circuit according to this invention.

The basic principle of this invention will be described with reference to FIG. 1. In the bit pattern check circuit shown in FIG. 1, an input bit pattern is divided into a plurality of portions of a number equal to the number of memory devices and the bit pattern check circuit is constituted by a first stage memory device addressed by one of the divided bit pattern portions and a second and following stage of memory devices addressed by the remaining divided input bit pattern portions and the outputs of the preceding memory devices respectively. The plurality of memory devices corresponding to the bit pattern to be checked are stored in their addresses with data representing respective bit patterns so as to detect the coincidence of the inputted bit pattern in accordance with the content of the last stage memory device.

Denoting the number of bits of a bit pattern to be checked by n, the address width of a memory device used by i, and the width of data read out from an address designated by an address input of the memory device by j (where i > j), bits from one end to the i-th bit of a bit pattern to be checked are supplied to a memory device Mo of the first stage. Data read out from the memory device Mo are supplied to the addresses of a memory device Ml of the next stage. Since the memory device M1 has i bit addresses (i−j) bits following the i of the bit pattern will be supplied to the (i−j) addresses thereof. The same operation is done for succeeding memory devices M2 to Mk. Consequently, the type number of the bit pattern to be checked is read out from the last memory device Mk. More particularly, a plurality of data assigned with numbers, for example (i−j) representing the type of the bit pattern, are stored in the memory device MO and the memory devices M1 to Mk are stored with numbers of the pattern type at their addresses corresponding to the sum of the data in a memory device of a preceding stage and a pattern assigned to each memory device.

Where data are stored in the memory devices in this manner, numbers i to j are stored in the memory devices in the order of Ml to Mk. Then, the relation among n, i, j and the memory number k is shown by the following equation $$n = i + k(i-j)$$

Accordingly, the number of the memory devices is (k+1).

Figure 2:
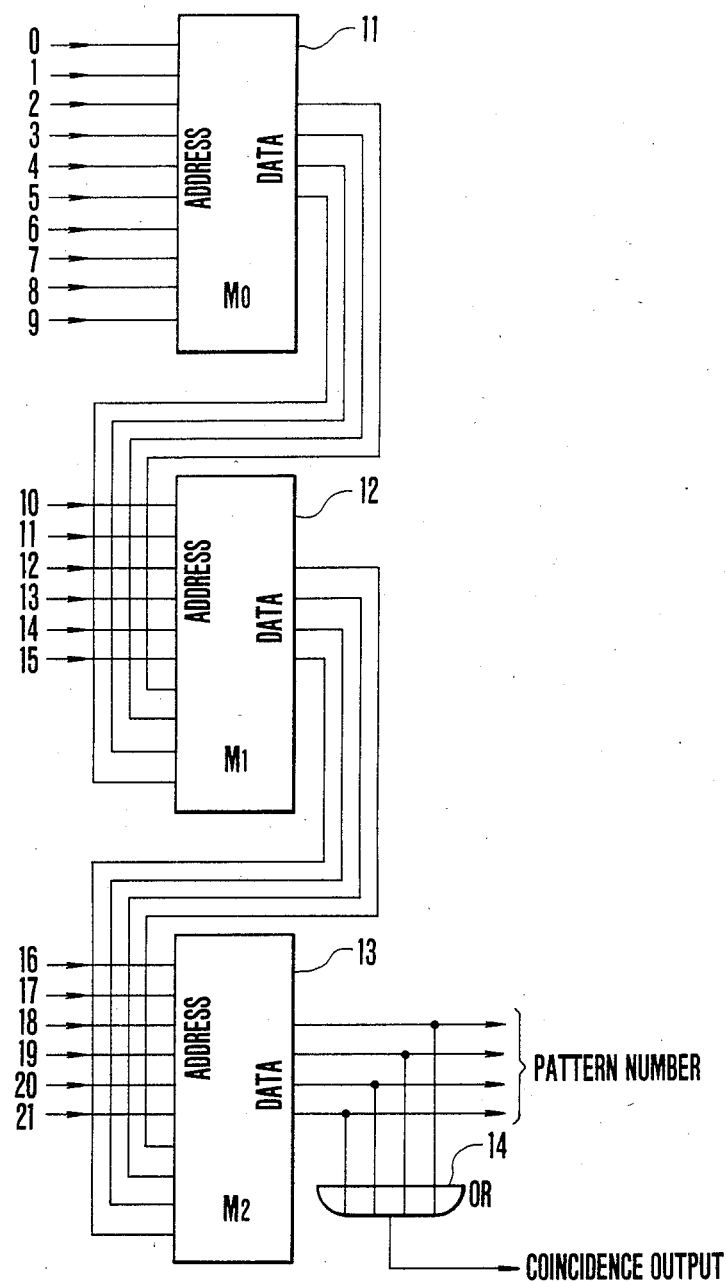
FIG. 2 is a block diagram showing the detail of the embodiment shown in FIG. 1 and FIGS. 3 and 4 are diagrams useful to explain the operation of the embodiment shown in FIG. 2 and FIGS. 5 and 6 are block diagrams showing modified embodiments of this invention.

The detail of the memory devices shown in FIG. 1 will now be described with reference to FIG. 2. The circuit shown in FIG. 2 is constructed to detect 15 types of the pattern from a bit pattern constituted by 22 bits, and utilizes three memory devices 11, 12, 13. For the purpose of inputting a desired bit pattern in respective memory devices, the bit pattern is divided into 3 portions, for example 0 to 9, 10 to 15, and 16 to 21. The bit portion 0 to 9 of the desired pattern is made to correspond to addresses of the memory device 11 corresponding to that bit pattern and the number of the desired pattern is stored in these addresses. In the same manner the next bit portion 10 to 15 of the desired bit pattern is made to correspond to the addresses of the lower order 6 bits of the memory device 12 of that bit pattern, whereas the pattern number of the memory device 11 is made to correspond to the addresses of upper order 4 bits of the memory device 12 corresponding to that pattern number so as to store the number of the desired pattern in the addresses determined by the upper and lower order bits. Furthermore, the next bit portion 16 to 21 of the desired bit pattern is made to correspond to the lower order 6 bit addresses of memory device 13, whereas the pattern number of the memory device 12 is made to correspond to the upper order 4 bit addresses of the memory device 13 so as to store the number of the desired bit pattern in the addresses determined thereby. As above described, many desired bit patterns are stored in the memory devices 11, 12 and 13 so as to hold the pattern to be checked. "0" are stored in the addresses of the other memory devices. Since the data are of the 4 bit construction, each one of the memory devices 11, 12 and 13 can store 16 types of data of "0000" to "1111". But since "0000" is not used as the pattern number, in the circuit illustrated, the maximum number of the types of the stored bit pattern is 15. An OR gate circuit 14 is inputted with the 4 bit output of memory device 13. When this 4 bit output coincides with any one of the many bit patterns stored, the memory device 13 would output an output different from "0000", so that the OR gate circuit 14 produces an output "1", thus detecting coincidences of 15 types of the bit pattern. The memory device 13 outputs pattern numbers coincident with the bit patterns.

Figure 3:
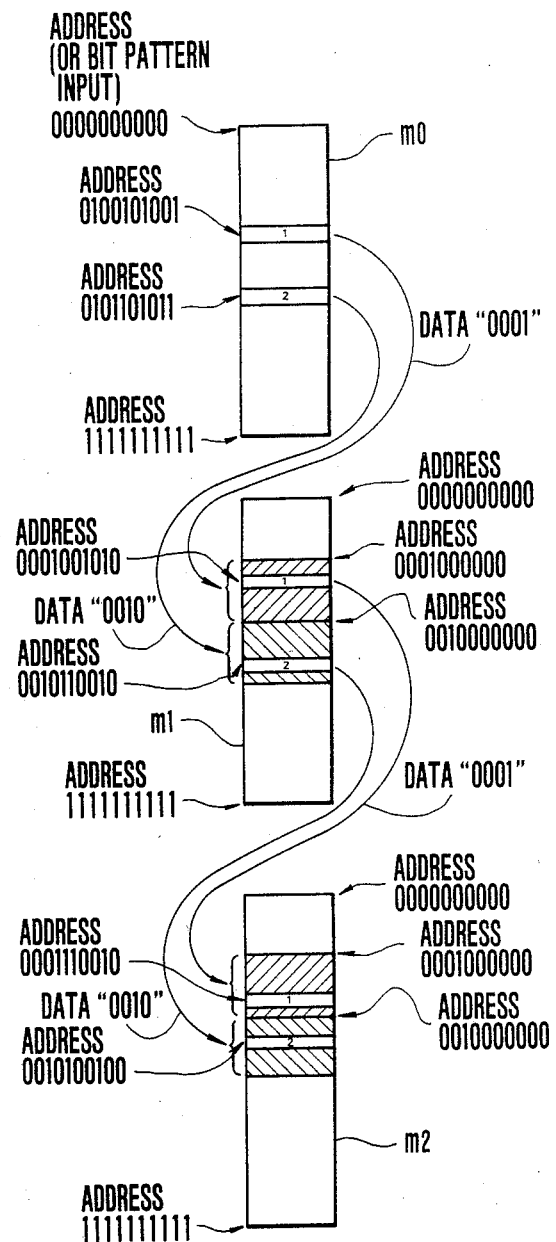

On the assumption that the following patterns 1 and 2 are stored in the memory devices, FIG. 3 explains the detecting operation of the coincidence. In FIG. 3, blocks m0, m1 and m2 respectively represents the memory areas of memory devices 11, 12 and 13 and data values [1] and [2] are stored in corresponding addresses shown by binary codes on both sides of respective blocks.

| Pattern 1 | 110010 | 001010 | 0100101001 |
| Pattern 2 | 100100 | 110010 | 0101101011 |

Suppose now that a bit pattern

| | 10010 | 001010 | 0100101001 | for example is applied to the check circuit shown in FIG. 2. Then addresses of the memory devices are shown as follows:

| address of memory 13 | address of memory 12 | address of memory 11 |
|---|---|---|
| 110010 | 001010 | 0100101001 |

At first, the lower order 10 bits of this memory pattern is stored in the addresses of the memory device 11. Then "0001" representing [1] of the data stored in the corresponding addresses of the memory region of memory device 11, that is the pattern type number [1] would be read out. This read out data is stored in the upper order addresses of the next memory device 12. As a consequence this data "0001" is combined with "001010" of the lower order 11th though 16th bits and the combined data "0001001010" is supplied to the memory device 12 as an address input. Consequently, the pattern type number [1], that is "0001" stored in these addresses is read out as the data. This data "0001" is supplied to the upper order addresses of the next memory device 13. Consequently a combination "000111001" of this data "0001" and "110010" of the lower order 17th to 22th bits of the bit pattern is supplied to the memory device 13 as an address input. Thus, the pattern type number [1] that is "0001" in the designated addresses is read out from the memory device 13. At this time the OR gate circuit 14 produces an output "1". Thus, the output of this OR gate circuit 14 means that a coincidence is obtained. In other words, the output of the memory device 13 shows that the bit pattern of the supplied bit information is [1] . The same is true for a bit pattern [2].

When checking the pattern [2], the lower 10 bits in memory device 11 are checked, 6 bits in memory device 12 are checked and the upper order 6 bits in memory device 13 are checked whereby [2], that is a binary code "0010" is read out from the memory device while at the same time OR gate circuit 14 produces an output "1". Since all other vacant addresses store "0", where not yet stored bit pattern is inputted, the OR gate circuit 14 would produce an output "0".

Figure 4:
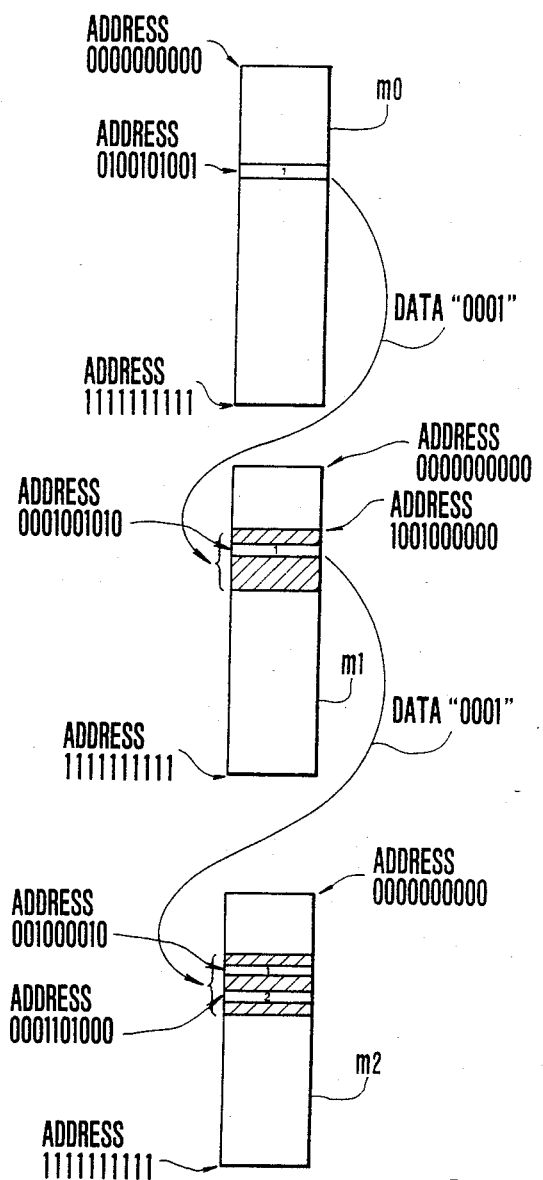

FIG. 4 is a block diagram wherein patterns [1] and [2] are the same pattern in the memory devices 11 and 12. Where patterns [1] and [2] are shown by the following example, as can be noted from FIG. 4, memory devices 11 and 12 produce the same output, but since the patterns of the upper order 6 bits are different, the memory device will output pattern numbers [1] and [2].

| Pattern 1 | 000010 | 001010 | 0100101001 |
| Pattern 2 | 101000 | 001010 | 0100101001 |

As above described according to this invention it is possible to construct a check circuit which checks coincidence of many bit patterns each comprising a plurality of bits and the construction of the check circuit of this invention is much simpler than the prior art circuit.

In the bit pattern check circuit of this invention, since check data is stored in a plurality of memory devices when RAMs are used as the memory devices, the interface between a computer and the check circuit can be simplified. Moreover, the check circuit can be applied to such supervisory system as data bus lines.

It should be understood that the invention is not limited to the embodiment described above and that many changes and modifications will be obvious to one skilled in the art. For example, in the embodiment described, although the bit number of the bit pattern was made to be equal to the total number of address input bits, the number of the total address bits may be larger than the bit number of the bit pattern. In this case a predetermined input of "0" or "1" is inputted to idle addresses of the memory device not assigned with bits of a bit pattern.

Although in the foregoing embodiment the memory devices had equal capacity, that is the same address number, it is possible to combine memory devices having different address numbers.

Figure 5:
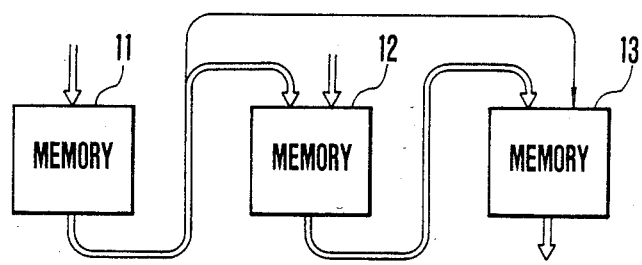

Furthermore, in the embodiment described above, the output of a preceding memory device was applied to the addresses of the next stage memory device, a portion or all of the output of the preceding memory device may be applied to the addresses of a memory device at a lower stages. More particularly, in a modification shown in FIG. 5 different divided portions of the bit pattern input are applied to addresses of the first and second memory devices 11 and 12 respectively, the output of the first memory device 11 is inputted to the second and third memory devices 12 and 13, and the output of the second memory device 12 is applied to the third memory device 13.

Figure 6:
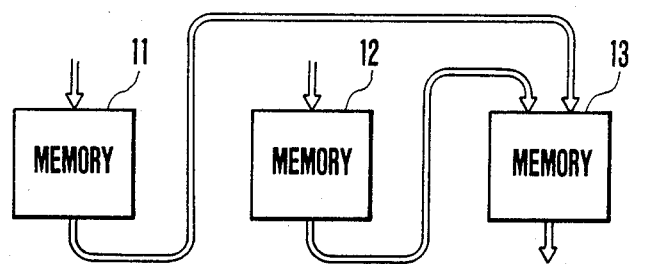

In another modification shown in FIG. 6 different divided portions of the bit pattern input are applied to the addresses of the first and second memory devices 11 and 12 respectively, and the outputs of the first and second memory devices 11 and 12 are inputted into corresponding addresses of the third memory device 13.

What is claimed is:

1. A bit pattern check circuit comprising:
   means for spacially dividing a bit pattern of N bits into M groups of bits, the arrangement of said groups and the bits within said groups being adapted to retain the original bit pattern;
   a plurality of memory devices connected as a first and following stages, each group of bits having a single corresponding stage;
   said memory device of a first stage being connected to receive into its addresses the first group of bits;
   memory devices in subsequent stages being adapted to receive into certain of their addresses all bits in a corresponding one of said M groups of bits and in certain other of their addresses the outputs of memory devices of preceding stages, whereby the last stage stores data respectively representing an identification of all prior groups of bit patterns by prior respective memory devices; and
   means connected to the last stage memory device for detecting coincidence of the inputted bit patterns in accordance with a content of the last stage memory device.

2. The bit pattern check circuit according to claim 1 wherein the number of the memory devices is 3 and said bit pattern input is divided into 3 portions of equal bit number and wherein said coincidence detection means comprises an OR gate circuit inputted with a pattern number read out from addresses of the third memory device.

3. The bit pattern check circuit according to claim 1 wherein said bit pattern input is divided into a plurality of portions having different number of bits.

4. The bit pattern check circuit according to claim 2 wherein said first and second memory devices are inputted with different portions of said divided bit pattern input, an output of said first memory device is inputted into addresses of the second and third memory devices and an output of said memory device is inputted into address of said third memory device.

5. The bit pattern check circuit according to claim 2 wherein said first and second memory devices are inputted with different portions of said divided bit pattern input and outputs of said first and second memory devices are inputted into said third memory device.

6. A bit pattern check circuit comprising:
   a plurality of lines which carry and input parallel digital signal to be checked with respect to a bit pattern thereof;
   input terminals which are connected with said lines in one to one correspondence and divided into a plurality of terminal groups;
   memory devices of the first and following stages associated with said terminal groups in one to one correspondence, each of said memory devices stores in an address having the same bit construction as a corresponding portion of one of the bit patterns to be checked and an identification code representing said one of the bit patterns;
   address bit lines of said memory device of the first stage connected to a terminal group corresponding thereto;
   less significant address bit lines of each of said memory devices of a following stage connected to a respective terminal group corresponding thereto;
   more significant address bit lines of each of said memory devices of a following stage connected with output data lines of a memory device of a preceding stage;
   output terminals connected to said output data lines of said memory device of a last stage to supply the identification code of the bit pattern of the input signal; and an OR circuit connected to said output data lines to obtain a logical OR of signals on said output data lines of said memory device of the last stage.

* * * * *